(12) United States Patent
Kotipalli

(10) Patent No.: US 7,554,529 B2
(45) Date of Patent: Jun. 30, 2009

(54) SMART SOFT KEYBOARD

(75) Inventor: Krishna V. Kotipalli, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 435 days.

(21) Appl. No.: 11/304,240

(22) Filed: Dec. 15, 2005

(65) Prior Publication Data

US 2007/0139382 A1 Jun. 21, 2007

(51) Int. Cl.
G09G 5/00 (2006.01)

(52) U.S. Cl. .......................... 345/168; 345/173; 341/22

(58) Field of Classification Search .................. 345/168, 345/169, 173, 156, 172, 179; 341/22; 379/368, 379/93.27, 93.18; 715/773; 178/18.01; 400/109, 400/109.1; 382/124, 187
See application file for complete search history.

(56) References Cited

U.S. PATENT DOCUMENTS

| | | | |
|---|---|---|---|
| 5,717,425 A | 2/1998 | Sasaki | |
| 5,812,117 A | 9/1998 | Moon | |
| 6,847,706 B2 * | 1/2005 | Bozorgui-Nesbat | 379/93.27 |
| 7,256,769 B2 * | 8/2007 | Pun et al. | 345/171 |
| 2002/0149569 A1 | 10/2002 | Dutta et al. | |
| 2004/0212590 A1 | 10/2004 | Koo et al. | |

OTHER PUBLICATIONS

International Search Report for International Application No. PCT/US2006/044741, Apr. 3, 2007, 11 pages.

* cited by examiner

Primary Examiner—Abbas I Abdulselam
(74) Attorney, Agent, or Firm—Lee & Hayes, PLLC

(57) ABSTRACT

Methods of using a soft keyboard are disclosed. A soft keyboard having one or more soft keys with a symbol displayed on the one or more soft keys is provided. A modifier may be applied to one of the symbols displayed on one of the soft keys by selecting the soft key and then providing a directional input. In an embodiment, different directional inputs are associated with different modifiers so that different symbols are inputted depending on the directional input. In an embodiment, a user may prove the direction input with a touch and directional drag of a selector across a touch sensitive screen. In an embodiment, a plurality of symbols associated with a plurality of modifying keys are made visible after the soft key is selected so that the user can visually determine which directional input will provide the desired symbol.

20 Claims, 12 Drawing Sheets

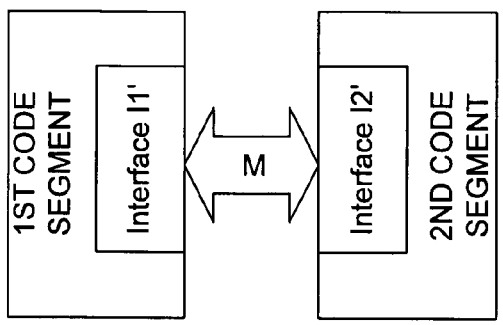
Fig. 1f
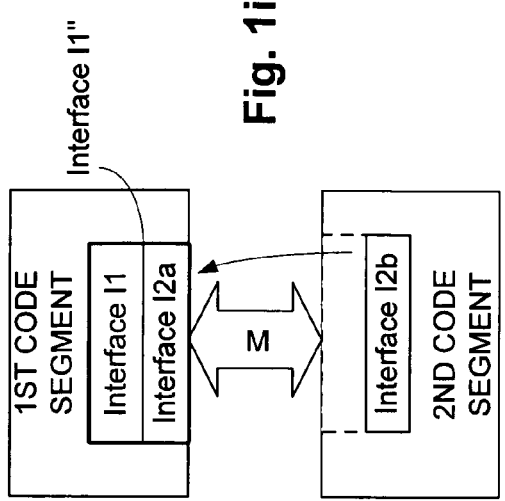
Fig. 1g
Fig. 1i
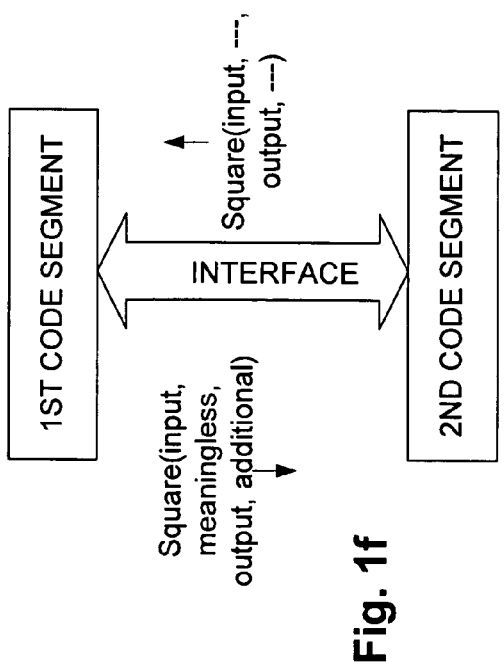
Fig. 1h
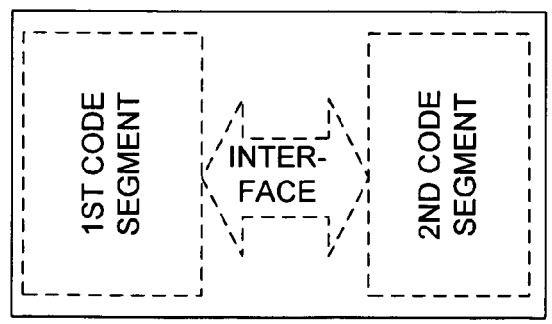

| 505b | 505c | 505d |
| --- | --- | --- |
| 1 | 4 | 7 |
| 505a | 505 | 505e |
| 2 | 5 | 8 |
| 505h | 505g | 505f |
| 3 | 6 | 9 |

| 505b | 505c | 505d |
| --- | --- | --- |
| À | à | â |
| 505a | 505 | 505e |
| A | a | ã |
| 505h | 505g | 505f |
| Â | Ä | ä |

SMART SOFT KEYBOARD

BACKGROUND

Portable computers, such as Tablet PCs, laptops, PDA and Pocket PCs, have a number of challenging design issues. On the one hand, it is desirable that they should be light weight and easily carried and be easy to use. On the other hand, it is desirable they should have a long battery life, be powerful and provide a large display. These potentially conflicting design guidelines make it difficult to produce the ideal portable computer.

To minimize weight and space, one method has been to use a soft keyboard on the display for data entry. One method of providing a soft keyboard is to provide a display with a touch sensitive feature. A portion of the display, which may be a fraction ranging from 1 to 1/N where N is a positive integer, may be configured to display symbols, such as character of an alphabet, on soft keys in an arrangement that resembles a keyboard. By pressing on the appropriate place on the display, the symbol may be selected. By repeatedly selecting symbols, an individual may enter data in a known manner.

As can be appreciated, however, there is a limited amount of space available on the display of a portable device. The available space is further reduced if a portion of the display is to be used to display the selections of the user. In addition, reducing the size of symbols below a certain point is impracticable due to the difficult in visually distinguishing the difference in the symbols. Therefore, it can be difficult to display all the symbols that might be otherwise desirable to be displayed. This problem is further acerbated with certain languages that include symbols that may or may not include an accent.

One solution has been to provide modifier keys such as the shift key. By selecting the appropriate modifier key, the choices available for each soft key can change. However, this requires addition selections. The use of a modifier key on a regular hard keyboard is typically not an issue because both hands can be used simultaneously. However, a soft keyboard typically is operated by using the same finger or pointing device to select subsequent soft keys. Thus, requiring the user to first select a modifier key and then select the desired soft key can undesirably decrease the speed of data entry.

SUMMARY

A soft keyboard having a number of soft keys may be provided on a touch sensitive display and each soft key may include a symbol. The user may select one of the soft keys by pressing a selector on the touch sensitive screen in the appropriate position. The user may select a modified version of the initially selected symbol by dragging the selector in a direction aligned with a modifier. The selection may be finalized or inputted by lifting the selector off the touch sensitive screen. To provide feedback to the user, the potential symbols associated with the initially selected symbol may be displayed around the initial selection so that dragging the selector in the direction of the desired symbol will allow the user to select that symbol.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and not limited in the accompanying figures in which like reference numerals indicate similar elements and in which:

FIGS. 1B through 1M show a general-purpose computer environment supporting one or more aspects of the present invention.

DETAILED DESCRIPTION

The use of a soft keyboard has a certain advantages. For one thing, APIs can be provided to allow other applications to control and monitor the use of the on screen display. In addition, the color and appearance of a soft keyboard is readily customizable. In addition, a similar soft keyboard can be used for a variety of applications and hardware with simple modifications to the display size of the soft keys and the font size used for the symbols. Further advantages will become apparent in light of the following disclosure.

General Computing Environment

Figure 1A:
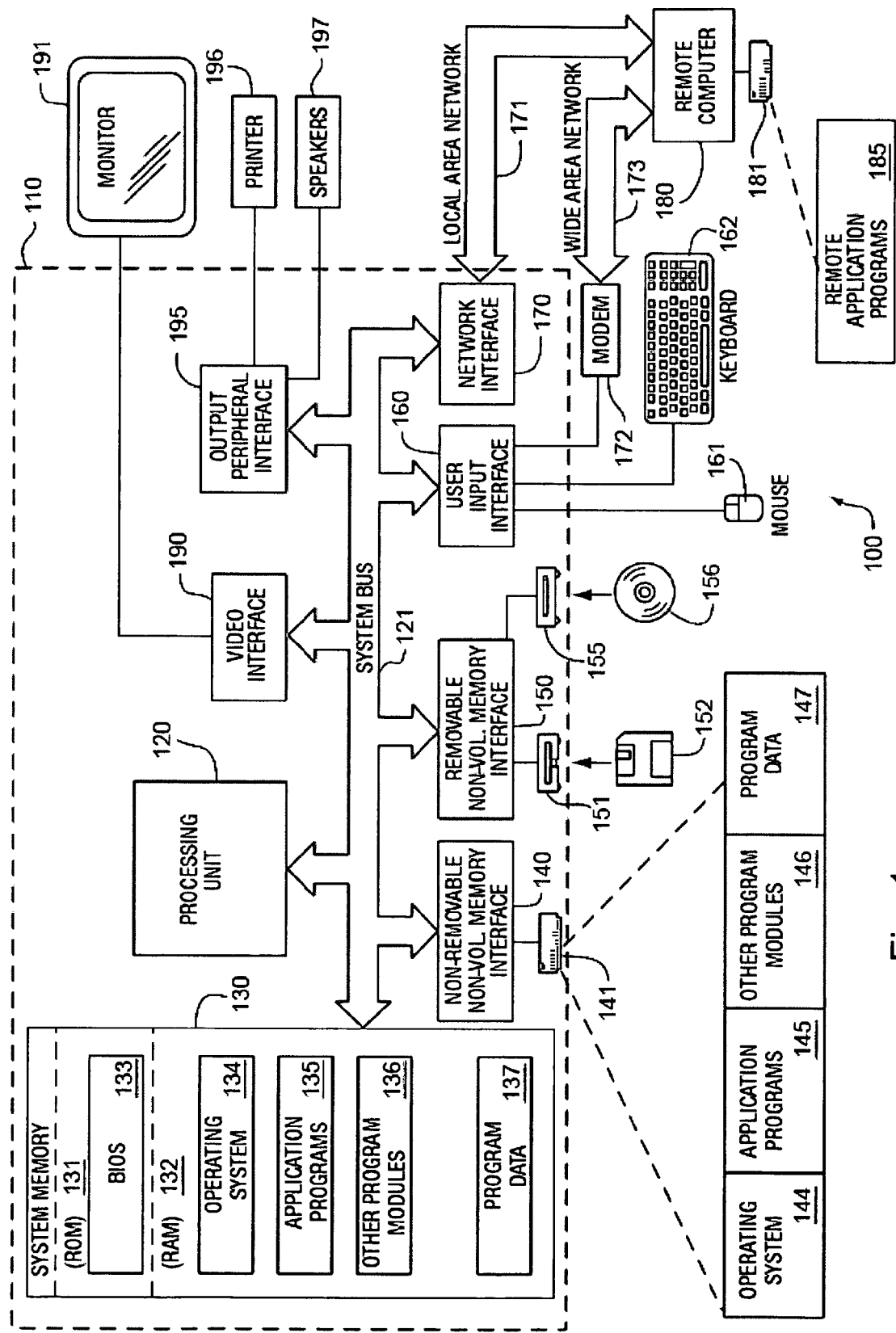
FIG. 1A illustrates a schematic diagram of a general-purpose digital computing environment in which certain aspects of the present invention may be implemented.

FIG. 1a illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1a, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1a illustrates operating system 134, application programs 135, other program modules 136, and program data 137.

The computer 110 may also include other removable/non-removable, volatile/nonvolatile computer storage media. By way of example only, FIG. 1a illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1a, provide storage of computer readable instructions, data structures, program modules and other data for the computer 110. In FIG. 1a, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1a. The logical connections depicted in FIG. 1a include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1a illustrates remote application programs 185 as residing on memory device 181. It will be appreciated that the network connections shown are exemplary and other means of establishing a communications link between the computers may be used.

Programming Environment

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 1C:
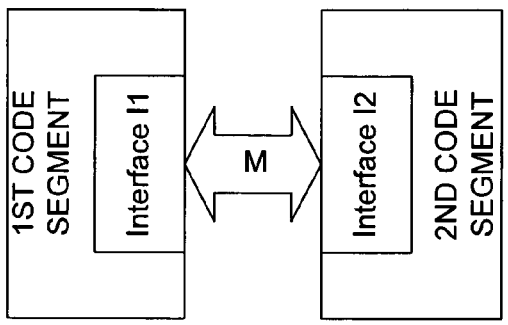
Figure 1E:
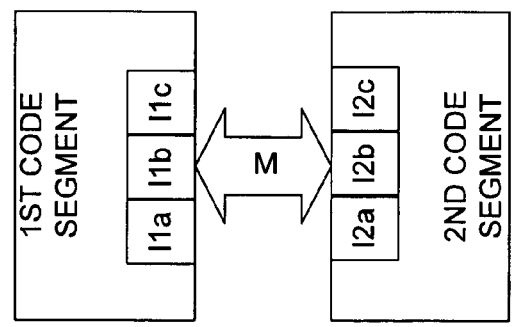
Figure 1B:
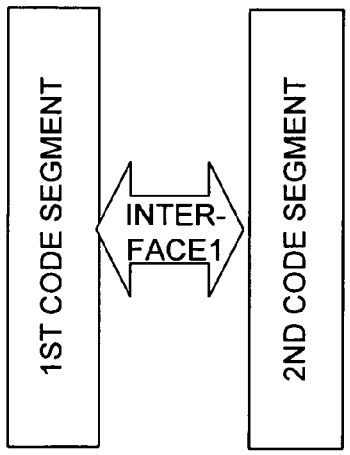

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface. Although FIGS. 1B and 1C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these other ways are intended to be encompassed by the claims set forth at the end of this specification. Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

A. Factoring

Figure 1D:
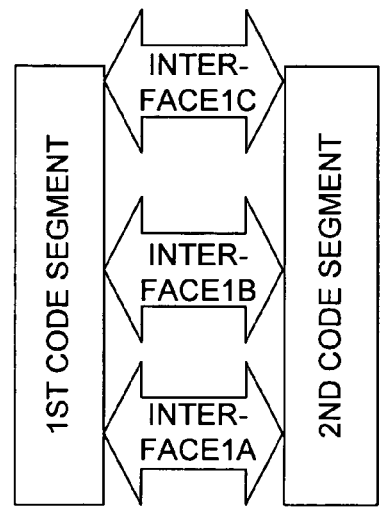

A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface1 may be subdivided to convert the communications of the interface into multiple interfaces Interface1A, Interface1B, Interface1C, etc. while achieving the same result. As illustrated in FIG. 1E, the function provided by interface I1 may be subdivided into multiple interfaces I1a, I1b, I1c, etc. while achieving the same result. Similarly, interface I2 of the second code segment which receives information from the first code segment may be factored into multiple interfaces I2a, I2b, I2c, etc. When factoring, the number of interfaces included with the 1st code segment need not match the number of interfaces included with the 2nd code segment. In either of the cases of FIGS. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface I2 from FIG. 1C may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 1C performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 1K:
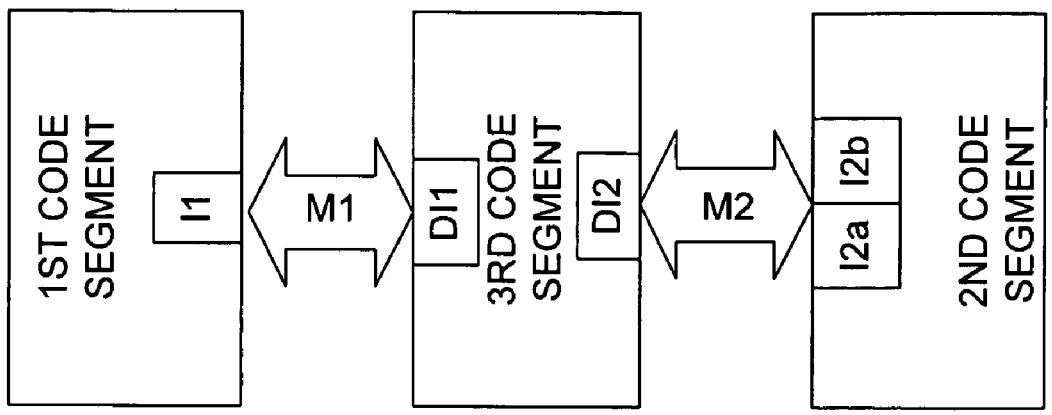
Figure 1J:
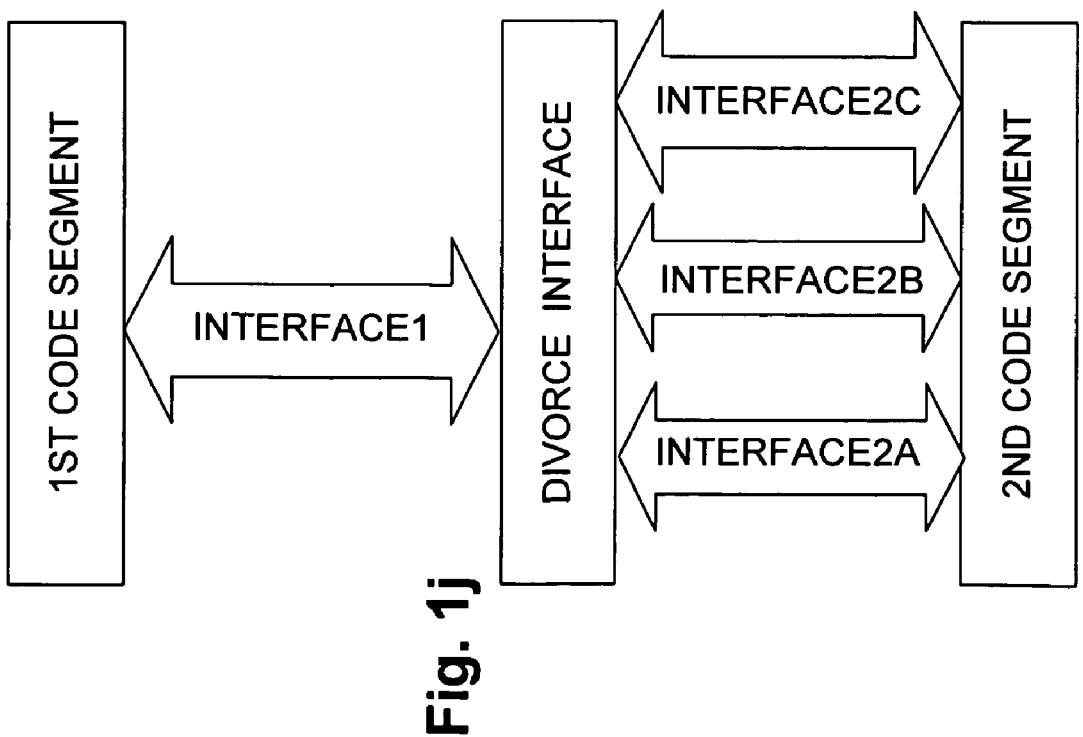
Figure 1I:
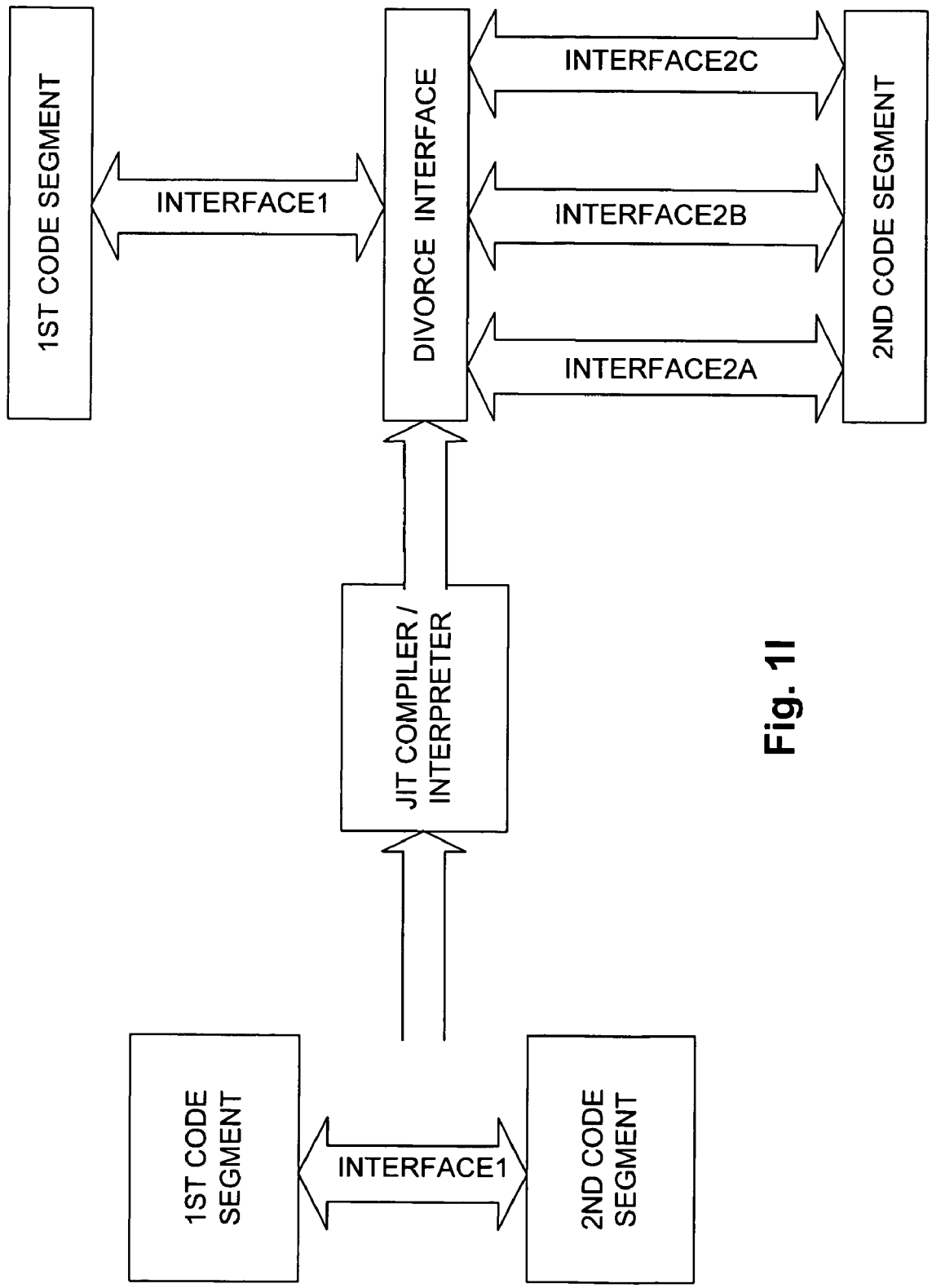

A communication from one code segment to another may be accomplished indirectly by breaking the communication into multiple discrete communications. This is depicted schematically in FIGS. 1J and 1K. As shown in FIG. 1J, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface 1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 1C to a new operating system, while providing the same or similar functional result.

E. Rewriting

Figure 1M:
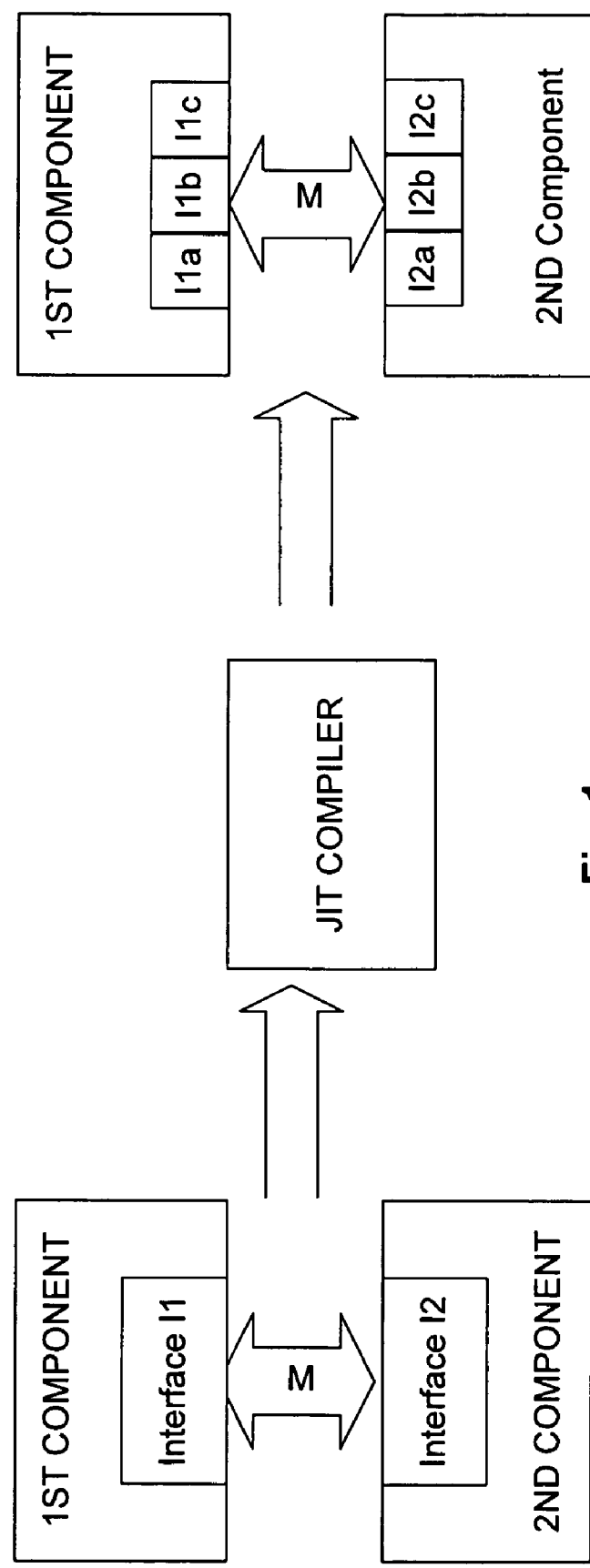

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Portable Computing Environments

Figure 2:
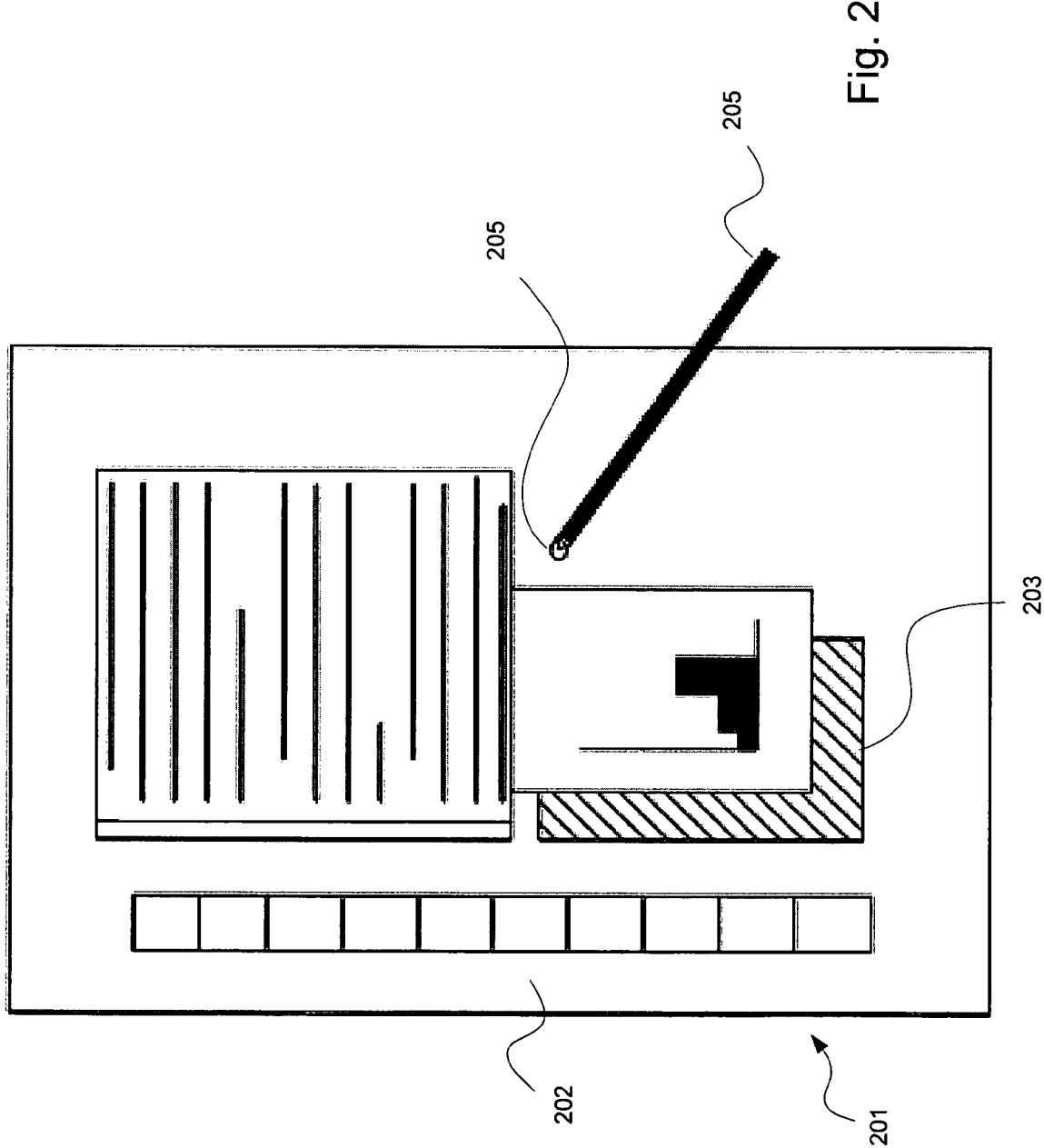
FIG. 2 illustrates a schematic diagram of a tablet computing environment in which one or more aspects of the present invention can be implemented.

FIG. 2 illustrates an illustrative tablet PC 201 that can be used in accordance with various aspects of the present invention. Any or all of the features, subsystems, and functions in the system of FIG. 1a can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, which is an example of a selector, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen",) in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202. Thus, a stylus 204 may be used as an effective selector in aspects of the present invention.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the .Net programming model from Microsoft Corporation.

Figure 3:
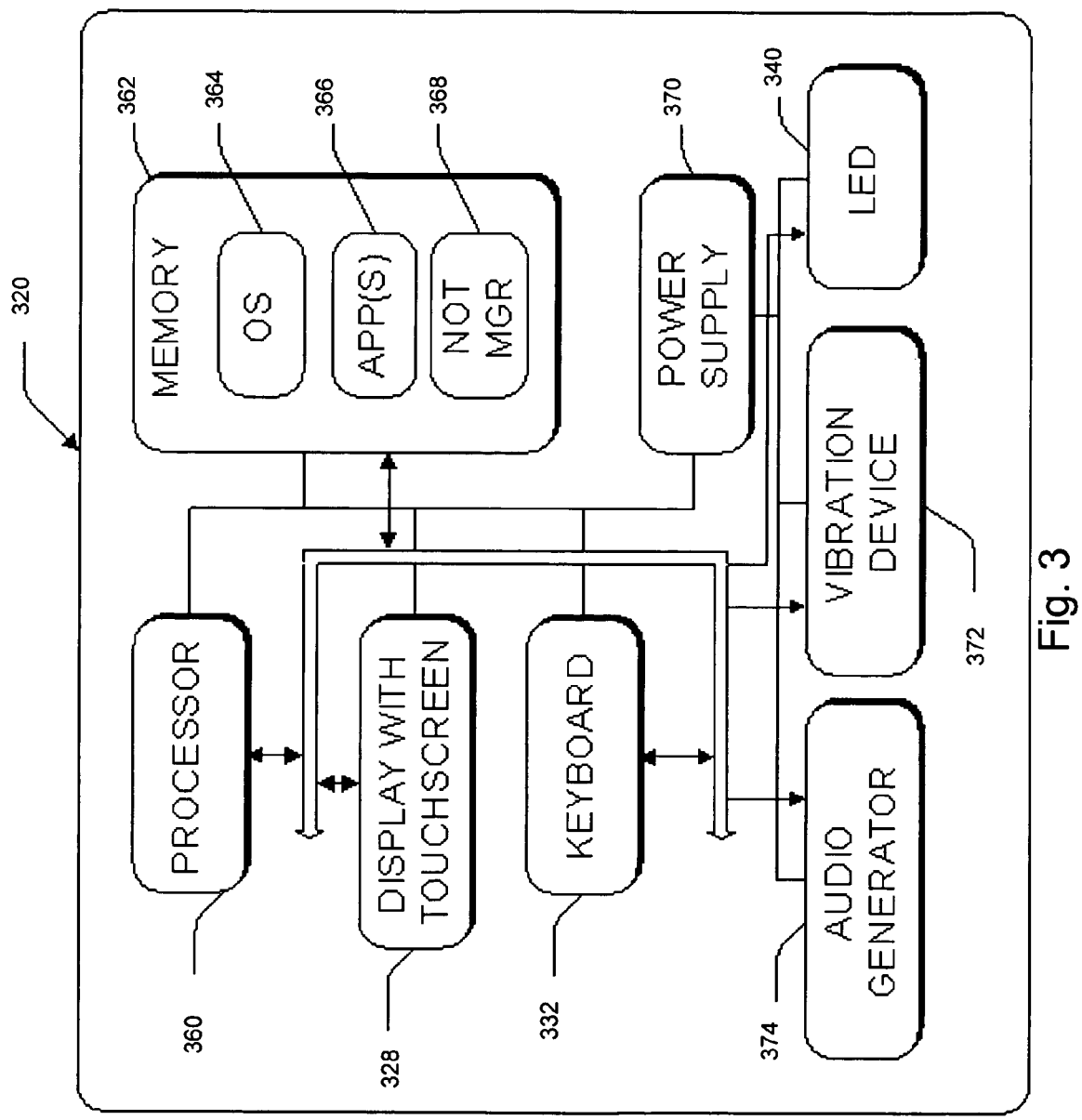
FIG. 3 illustrates a schematic diagram of a portable computer environment in which one or more aspects of the present invention can be implemented.

FIG. 3 shows functional components of the handheld computing device ("H/PC") 320. As depicted, the H/PC 320 includes a processor 360, a memory 362, a display 328, and a keyboard 332. The memory 362 may include both volatile memory (e.g., RAM) and non-volatile memory (e.g., ROM, PCMCIA cards, etc.). An operating system 364 can be resident in the memory 362 and may be executed on the processor 360. In an embodiment, the H/PC 320 includes an operating system, such as the Windows® CE operating system from Microsoft Corporation or other operating system.

One or more application programs 366 can be loaded into memory 362 and run on the operating system 364. Examples of applications include email programs, scheduling programs, PIM (personal information management) programs, word processing programs, spreadsheet programs, Internet browser programs, games and other known applications. The H/PC 320 may also include a notification manager 368 loaded in memory 362, which may also execute on the processor 360. The notification manager 368 can handle notification requests from the applications 366.

The H/PC 320 includes a power supply 370, which may be implemented as one or more batteries or some other power source such as a capacitor or fuel cell or the like. The power supply 370 might further include an external power source that overrides or recharges the built-in batteries, such as an AC adapter or a powered docking cradle.

As depicted, the H/PC 320 includes three types of external notification mechanisms: an LED 340, a vibration device 372, and an audio generator 374. These devices may be directly coupled to the power supply 370 so that when activated, they can remain on for a duration dictated by the notification mechanism even though the H/PC processor 360 and other components might shut down to reduce energy consumption. In an embodiment, the LED 340 may remain on until the user takes action. The current versions of the vibration device 372 and audio generator 374 use too much power for today's H/PC batteries, and so they may be configured to turn off when the rest of the system does or at some finite duration after activation.

Applications

Figure 4:
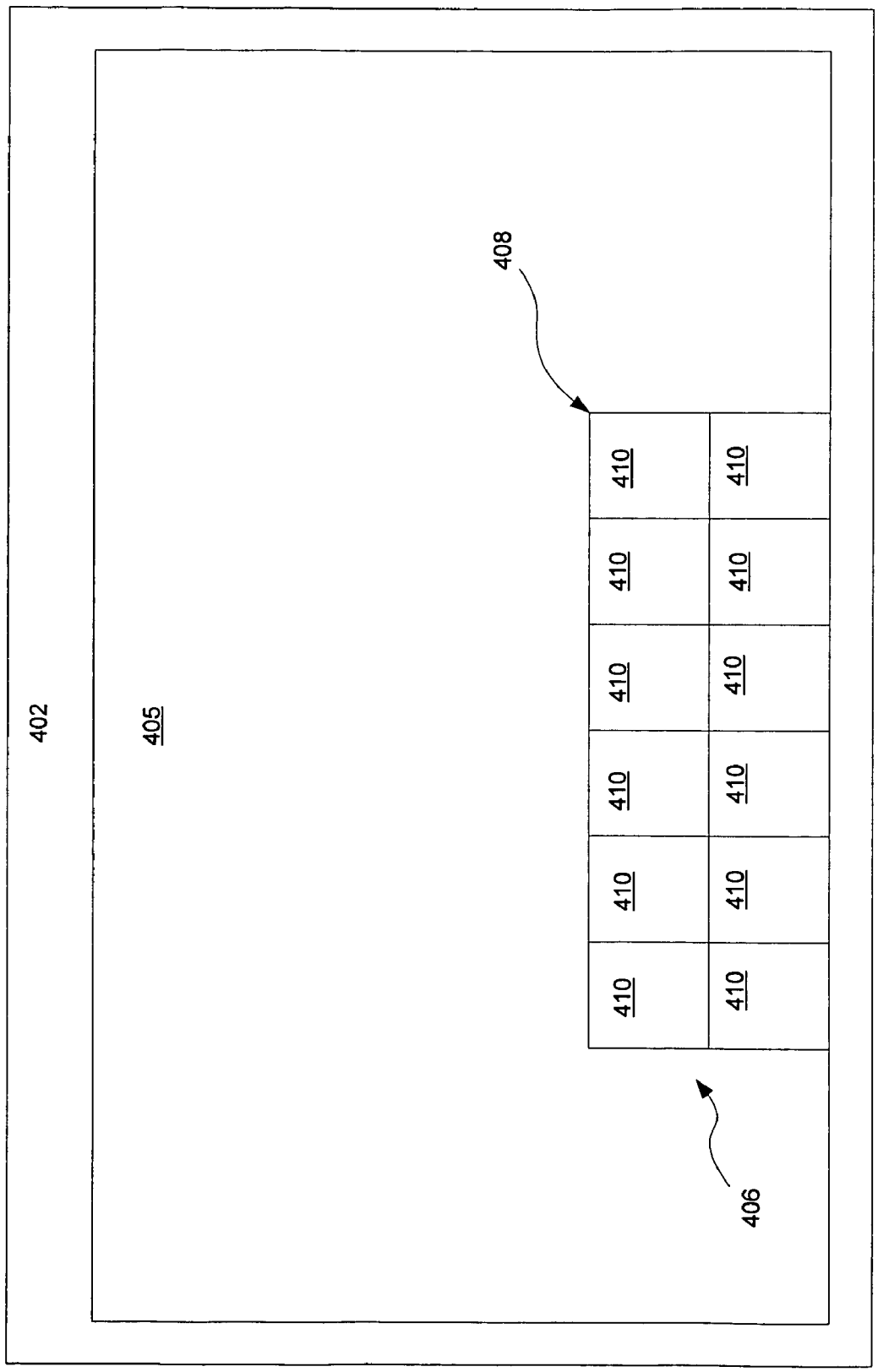
FIG. 4 illustrates an embodiment of a soft keyboard on a display in which one or more aspects of the present invention can be implemented.

Turning to FIG. 4, an embodiment of a portable computer 401 is depicted. The portable computer, which may be configured as discussed above, includes a housing 402 in which a display 405 is provided. As depicted, a soft keyboard 406 including an arrangement 408 of soft keys 410 is provided. It should be noted that other arrangements 408 may also be provided.

If desired, the arrangement 408 of the soft keyboard 406 could be controllable by an application through an API as discussed above. In an embodiment, a parameter could be used to adjust the arrangement 408 of the soft keys 410. The parameter could include a default value that could be modified so as to adjust the arrangement 408, thus different applications could adjust the arrangement 408 of the soft keys 410 as desired. In an embodiment, the soft keyboard 406 could include a set of arrangements 408 could be selected by the application, each arrangement placing the soft keys 410 in different predetermined locations. In another embodiment, the arrangement 408 might be fully customizable so that applications could locate individual soft keys 410 as desired.

Figures 5, 6A, 6B:
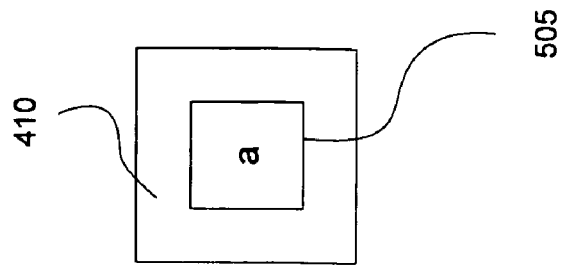
FIG. 5 illustrates a soft key displaying a symbol in which one or more aspects of the present invention can be implemented.
FIGS. 6a through 6b illustrate embodiments of a set of symbols provided along a perimeter of a first symbol in accordance with one or more aspects of the present invention.

In order to allow individuals to enter data into the computing device, each soft key 410 may be associated with a symbol such as the character "a" as used in the English language. In an embodiment, as depicted in FIG. 5, the soft key 410 may include a symbol 505 positioned approximately near the center of the soft key 410. Once the soft key 410 is selected, which may be effected by pressing a selector on a surface of a touch sensitive display, the display associated with the soft key can be adjusted. As can be appreciated, if soft key is large enough, more than one symbol may be displayed on the soft key and selecting the soft key allows the user to then select which of the symbols being displayed is desired to be chosen.

In an embodiment, as depicted in FIG. 6a, the selecting of the soft key 410 causes additional symbols 505 to displayed. It should be noted that the selecting may be the pressing of a selector on the touch sensitive display at the position aligned with the desired soft key. In an embodiment, symbols 505a through 505h may be displayed. Symbol 505 may also continue to be displayed. The symbols 505a-505h represent symbol 505 in conjunction with different modifier keys. Thus, symbol 505a is associated with symbol 505 and a first modifier key.

FIG. 6b illustrates an alternative embodiment. Symbol 505 is a representation of a "5." By providing a direction input, another number such as 1-4 or 6-9 may be selected. As can be appreciated, such an embodiment would allow a single soft key to provide all the digits except zero. One possible method of providing zero is to require the user to move provide a direction drag first in one direction and then in the opposite direction. Thus, as can be appreciated, compound movements could be associated with an additional modifier keys if desired. Alternatively, one or more of the symbols associated with the various modifiers could change after a period of delay. Thus, in an embodiment, if the touch was maintained without provided a directional input, the symbol 505 could change from a "5" to a "0" after some predetermined period of time.

In an embodiment, a user may select a soft key 505 and the various symbols may become visible immediately. In an alternative embodiment, the various symbols may only appear if the user makes prolonged contact with the soft key 505. As can be appreciated, the period of contact with the soft key 505 required to cause the additional symbols to appear may be adjusted through an API as discussed above.

In an embodiment, certain symbols representing the most common modifications to the symbol 505 may appear first. Thus, a tiered response may be provided. In addition, certain positions may be populated with a symbol before other positions. As can be appreciated, many variations are possible and in an embodiment these variations can be adjusted through an API. Thus, for example but without limitation, symbol 505a might appear first, and then symbol 505e, and so on. As can be appreciated, if the symbol 505 lacks sufficient possible modifications, the number of symbols 505a-505e that may be displayed may be reduced accordingly. Furthermore, certain symbols can be assigned to user defined events and actions and be customizable by the application or the user or both.

In an embodiment, the first symbol displayed on the soft key and the symbols associated with the initially displayed symbol may be determined in response to an application. Thus, certain initially displayed symbols might have a greater number of associated symbols while other symbols might have a lesser number of associated symbols. In an embodiment, a first symbol might have a single second symbol representative of a first symbol subjected to a modifier associated with it. In such an embodiment, a contact with a time greater then the programmed period, which may be any period of time greater than zero, could cause the second symbol to appear. To increase the number of options associated with such a symbol, a user could associate additional symbols with the first symbol. In an embodiment, the user could select the position of the additional symbols, either by displacing existing symbols or by choosing a position that was not presently being associated with the first symbol and a directional input. In an alternative embodiment, the position would be selected automatically by the application accord to an algorithm. One such algorithm might be to first populate the positions depicted as symbols 505a, 505c, 505e, and 505g in FIG. 6 in a clockwise manner. As can be appreciated, variations in such an algorithm are numerous and could include statistical analysis of a user's actions and could also include input from usability studies.

To select a symbol, the user could move the selector, which could be a stylus or finger or some other device suitable for providing directional input, in the direction of the symbol. As depicted in FIG. 6, 8 directions of movement after the initial selection could provide eight different symbols related to the first symbol 505. However, if the user did not provide a directional input (or if the directional input was below a predetermined threshold), then the first symbol 505 would be chosen. It should be noted that while 8 different symbols are illustrated, additional symbols could be displayed. However, it is likely that an individual would have trouble consistently providing an accurate movement in more then eight directions, thus some additional steps might be useful if more than 8 modifiers are to be associated with a single soft key.

In an embodiment, the additional symbols could be displayed along a perimeter outside the boundary of the soft key 505 and could be spaced apart. To aid the user in selecting the desired symbol, movement in the direction of the symbol would cause a graphical change such as a change in color or gradient of the potentially selected symbol. The user could then move in a different direction to cause a different symbol along the perimeter to be highlighted. As can be appreciated, the number of associated symbols, the size of perimeter, the type of feedback, and the sensitivity are just some of the parameters that could be varied from soft key to soft key and from application to application and these parameters could be controlled by applications through an API.

Figure 7:
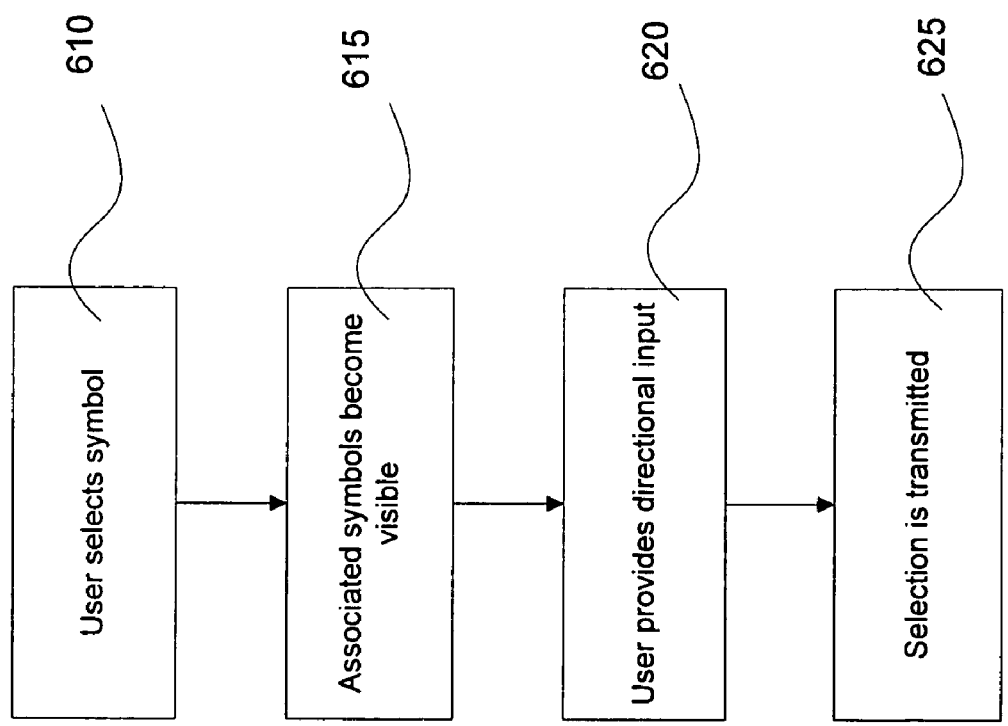

FIG. 7 illustrate a method of selecting a symbol in accordance with an aspect of the present invention. As illustrated, in step 710 the user selects a first symbol. In an embodiment, the selection involves pressing on the surface of the touch sensitive display with a selector, the touch aligned with a desired soft key displaying an appropriate symbol.

Next in step 715, a set of symbols associated with the first symbol becomes visible. In an embodiment, the set contains one symbol. In an alternative embodiment, the set contains 8 symbols. As can be appreciated, variations in the number of symbols provided in the set may vary as desired. In an embodiment the symbols may gradually become more visible or may appear in some other manner such as sliding in from the right, sliding out from the center, or just suddenly appearing. As can be appreciated, this graphical control on how the symbols are populated and made visible can be varied and may be controlled through an API. A gradual fading in may be useful because it would allow the user to receive a reminder as to which symbols were associated with the initially selected symbol without providing undesirable clutter on the screen.

In step 720, the user provides directional input to select a symbol from the set of symbols associated with the initially selected symbol. The directional input can be provided by moving the selector in the direction of the desired symbol. In an embodiment, the directional input may be provided by sliding the selector along the surface of a touch sensitive display in a direction aligned with a symbol in the set of symbols. This sliding may be referred to as directional dragging of the selector. As noted above, the directional input may cause the symbol that is associated with the particular directional input to become highlighted. In an embodiment, the highlighted symbol could change sizes, could change color or contrast or could provide some other sort of graphical feedback including animation. In an embodiment, multiple symbols may be provided in the set. In an embodiment with multiple symbols provided in the set, the initial directional input provided by the user will chose one of the symbols in the set. In an alternative embodiment with multiple symbols in the set, the user may freely move in different directions so as to highlight and chose different symbols other than the symbol that would have been chosen based on the initial direction input provided.

Then, in step 725, after the desired symbol is highlighted, the user finalizes the selection and causes the highlighted symbol to be transmitted (e.g. enters or inputs the desired symbol into the application). In an embodiment, the finalizing of the selection of the symbol could be effected by removing the selector from the surface of the display. As can be appreciated, other methods such as an actuation of an input device could also be used to finalize the selection the highlighted symbol. In an embodiment, an actuation of a button could cause the finalized selection and transmission of the currently highlighted symbol. Such a method might be useful for a portable device in a situation where the user is experiencing a significant amount of vibration or is unable to hold the selector steady for some other reason such as a medical condition.

Figure 8:
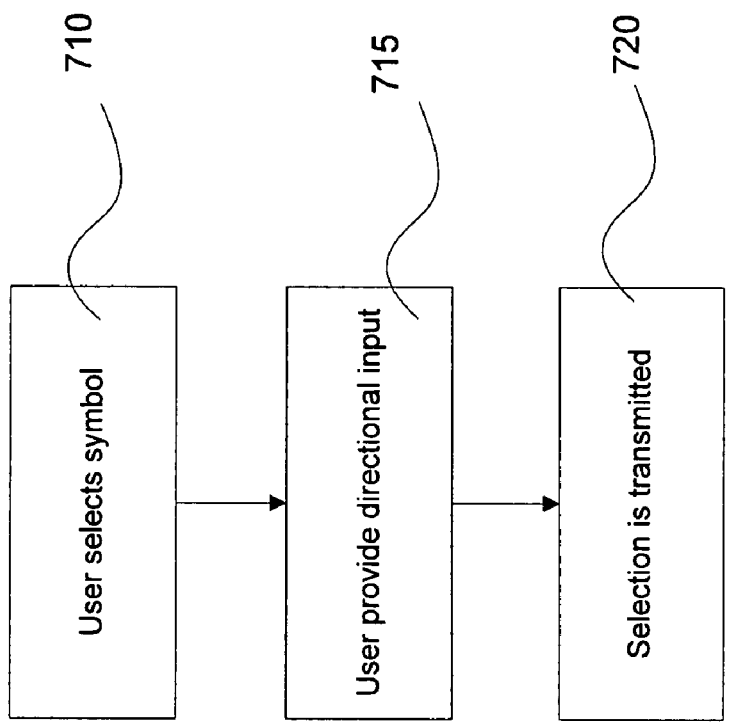
FIGS. 7 through 8 illustrate methods of selecting symbols associated with a first symbol in accordance with one or more aspects of the present invention.

FIG. 8 illustrates another embodiment of a method of selecting a symbol. As can be appreciated, a difference between the methods depicted in FIG. 7 and FIG. 8 is that the step of having symbols associated with the first symbol become visible is omitted. Thus, in an embodiment, the symbols associated with the first symbol will not become visible but can be still be selected by the appropriate selection and directional input provided by the user. In an alternative embodiment, the selection of a symbol will not cause associated symbols to become visible unless there is an extended period of delay (e.g. the user continues to press on the touch sensitive display for an extended period of time). In another alternative embodiment, the associated symbols will not become visible unless the user provides a secondary input. As can be appreciated, whether the associated symbols become visible may be controlled by an application and could be set so as to be controlled by the user through the switching on or off the feature in an application.

An advantage of the method depicted in FIG. 8 is that the display is not cluttered with additional symbols and, depending on the type of display, less power may be required as there is no change made to the display. In addition, such a method is less complex from a graphical standpoint. As can be appreciated, however, such a method does require the user to know what symbols are associated with the first selected symbol along with the direction of movement required to select the desired associated symbol. For certain languages where there are many secondary symbols associated with the first symbol, a configuration of not displaying the secondary symbols may be somewhat more difficult. Therefore, such a configuration may be best suited for power or expert users.

As can be appreciated from the above discussion, when there are multiple symbols associated with each symbol, it becomes more difficult to provide sufficient information to the user without undesirably cluttering up the display. One potential solution that may be used in accordance with various aspects of the present invention is to associate a particular modifier key with a particular direction. For example, if the possible directions are associated with a value in degrees ranging between 0 and 359 degrees (because 360 degrees would be the same as 0), movement along a vector at 0 degrees could be associated with the shift key. It should be noted that the direction of 0 degrees depends a reference point and therefore can be adjusted as desired. Referring back to FIG. 6, 0 degrees could be aligned with the location of symbol 505a. Thus, in an embodiment, placing a selector on a symbol and then moving in the direction of zero degrees (e.g. up) would be the equivalent of pressing a "select" soft key and then pressing the symbol. As can be appreciated, pressing a symbol and then providing a directional drag is more efficient and can be done more quickly then first selecting a shift soft key and then selecting the desired key. While numerous variations are possible, it may be helpful to require the user to aim for regions of at least 45 degrees so that there is sufficient separation between selections.

In an embodiment, up (or 0 degrees) can be associated with the "shift" modifier key, down (or 180 degrees) with the "control" modifier key, right (or 270 degrees) with the "alt" modifier key, and left (or 90 degrees) with a "function" modifier key. As can be appreciated, variations of this can be provided and the direction associated with a particular modifier may be user customizable. In addition, certain modifications to the symbol such as superscript or subscript could also be associated with a directional drag.

It should be noted that certain soft keys may not have sufficient variations possible to populate all the directions associated with the symbol displayed on the soft key. For example, there may not be anything associated with the modifier "alt" and the English symbol "m." While this can be application specific and adjustable through an API as discussed above, in an embodiment, a first symbol may normally only have one modifier associated with it, such as but not limited to, a shift modifier. For example, in an embodiment, a keyboard intended to be use for typing in English could associate an upward direction with a capital version of the 26 letters of the alphabet and any other movement could be ignored. Thus, a capital "a" could be entered by selecting the "a" soft key and then providing a direction drag in a zero degree direction or vector. In an alternative embodiment, capital letters could be the normal type of symbol entered and lower case letters could be entered by selecting a capital letter and then dragging along a 180 degree vector.

Regardless of the number of symbols associated with a symbol depicted on a soft key, it may be useful to allow a user to associate additional symbols with the first symbol, as mentioned above. Thus, in an embodiment, the user could assign a symbol to a soft key and a direction of movement. In such an embodiment, the symbol "§" could be associated with selection of the soft key that displayed the symbol "s" and a downward movement. The user could even import additional symbols if desired. Thus, as can be appreciated, the user's creativity is the primary limiting factor to the number of possible variations.

In an embodiment, a series of actions could also be assigned to a particular selection and direction of movement. For example, a macro to make future symbols bold could be associated with the selection of the symbol "b" and a movement to the right. To turn off the bold feature, the same operation could be used or the user could select "b" and move to the left. Thus, as can be appreciated, numerous variations, some or all of which could be customizable according to application, exist. It should be noted that more complex macros could also be associated with a selection of a soft key and a directional input.

It should be noted that certain languages limit input based on what was previously entered. In addition, certain languages form combinations of letters. For example, selection of an "n" in Japanese Kana could provide the user with the choice of na, ni, nu, ne and no. Thus, after entry or selection of an initial symbol, the individual will only be able to enter certain symbols that correspond to the context of the previously entered or selected symbol. Thus, in an embodiment, the symbols associated with a particular symbol can adjust according to grammatical rules of writing and previously entered symbol(s).

Figure 9:
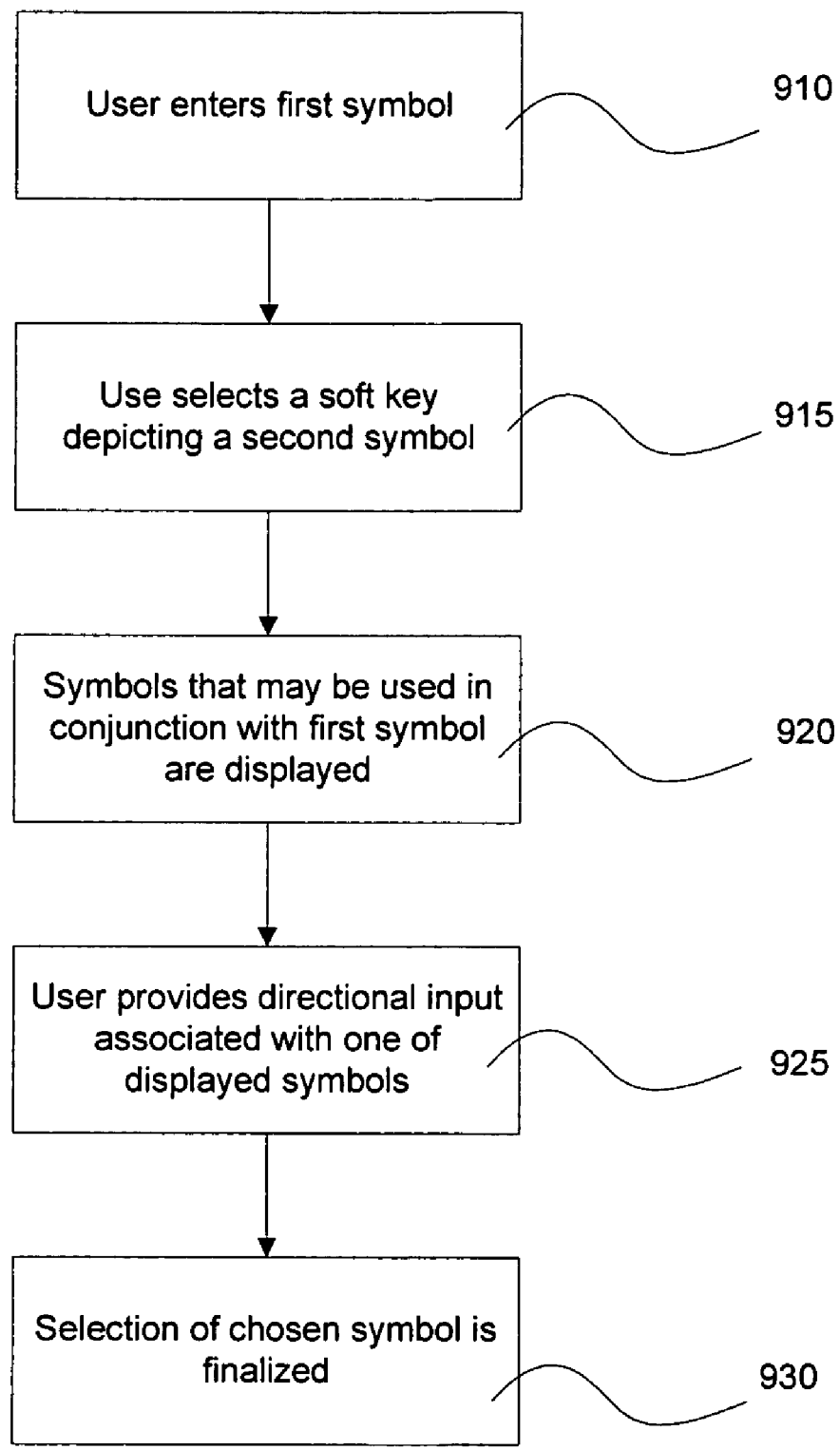
FIG. 9 illustrates a method of inputting a symbol in accordance with one or more aspects of the present invention.

FIG. 9 illustrates an embodiment of such a method. First, in step 910, the user enters a first symbol. The entering of symbols may be provided by using a selector, which may be a stylus, to touch and release a soft key that is provided on a soft keyboard on a touch screen display. Next, in step 915, the user selects a soft key that displays a second symbol; the second symbol related to or intended to be used with the first symbol. In an embodiment, the selecting is accomplished by continuing to press on the soft key with the selector. As the second symbol can be associated with a number of potential variations, in step 920 a set of symbols relating to at least some of the potential variations in the second symbol is displayed around the second symbol. In an embodiment, all the symbols that are associated with the first symbol and the second symbol are displayed around the second symbol in a desired manner.

In step 925, the user provides directional input. As the symbols are provided around the second symbol, movement away from the initial point of selection will typically be toward one of the symbols in the set. In an embodiment, the directional input may be provided by dragging the selector across the touch sensitive display toward one of the symbols in the set after initially pressing on the soft key that displayed the second symbol. In step 930, the user stops the selection and direction input process and the selection of the chosen symbol from the set of symbols is finalized (e.g. entered). In a word processing application, the entering could result in the chosen symbol being displayed next to the previously entered symbol. In an embodiment, the user may finalize the selection by lifting the selector off the touch sensitive screen after dragging the selector in the direction of the desired symbol. The finalizing of the selection may also be referred to as inputting or entering or transmitting the chosen symbol. In an embodiment, as discussed above, the display can highlight the currently chosen symbol so as to provide feedback to the user regarding which symbol will be entered if the user lifts the selector from the display at that moment.

It should be noted that while applications may control the disclosed features through an API, an operating system may also control the features if desired. Potentially increased levels of flexibility are provided, however, if the features are controllable by an application through an API.

The present invention has been described in terms of preferred and exemplary embodiments thereof. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Numerous other embodiments, modifications and variations within the scope and spirit of the appended claims will occur to persons of ordinary skill in the art from a review of this disclosure.

I claim:

1. A method of inputting data into an application running on a computer with a soft keyboard on a touch sensitive screen, the method comprising:
   receiving a selector touch on the touch sensitive screen;
   displaying a second symbol associated with a first symbol, the displaying comprising generating a graphical depiction of the second symbol associated with the first symbol on the touch sensitive screen in an appropriate position immediately after receiving the selector touch;
   receiving a selector directional drag on the touch sensitive screen;
   determining that the selector touch is associated with a first soft key depicting a first symbol and the selector directional drag is associated with a first modifier key;
   selecting the second symbol, the second symbol associated with the first symbol and the first modifier key; and
   transmitting the second symbol to the application.

2. The method of claim 1, wherein four modifier keys are associated with the first symbol and wherein each modifier is associated with a different direction selected from a set of directions consisting of 0 degrees, 90 degrees, 180 degrees, and 270 degrees, and the selector directional drag is directed along the 0 degree direction.

3. The method of claim 1, wherein the determining the soft key associated with the selector touch comprises:

determining that the selector is touching the touch sensitive display in a first position; and
determining that the first soft key is associated with the first position on the touch sensitive display.

4. The method of claim 1, wherein the receiving the selector directional drag comprises:
   determining a first position that the selector touched the touch sensitive screen;
   determining an end position when the selector stops touching the touch sensitive screen; and
   determining a vector associated with the change in position between the first position and the end position.

5. The method of claim 4, wherein the determining that the first modifier key is associated with the selector directional drag comprises:
   determining a set of directions associated with the first soft key;
   determining a first direction from the set of directions that the vector of the selector directional drag is most closely aligned with; and
   determining that the first modifier key is associated with the first direction.

6. The method of claim 5, wherein the receiving the selector directional drag further comprises:
   highlighting the second symbol associated with the first modifier key.

7. The method of claim 1, further comprising:
   after receiving the selector touch but before the selector directional drag is received, visibly positioning the second symbol along a vector associated with the first modifier key.

8. The method of claim 1, further comprising:
   after receiving the selector touch, displaying one or more additional symbols associated with the first symbol;
   generating a graphical depiction of each of the one or more additional symbols in appropriate positions immediately after receiving the selector touch;
   determining that the selector touch is associated with the first soft key depicting the first symbol and a selector directional drag is associated with a modifier key related to one of the one or more additional symbols;
   selecting the one of the one or more additional symbols; and
   transmitting the one of the one or more additional symbols to the application.

9. A computer readable storage medium including computer readable instructions for performing a method, the method comprising:
   receiving a first selection associated with a first soft key having a first symbol;
   determining a set of symbols associated with the first soft key;
   receiving notification that a selector touched a touch sensitive screen for a predetermined period;
   displaying the set of symbols around the first symbol after the predetermined period;
   receiving a directional drag associated with the first selection; and
   communicating a second symbol from the set of symbols, the second symbol associated with the directional drag and the first symbol.

10. The computer readable storage medium for performing the method of claim 9, the method further comprising:
    after receiving the directional drag, highlighting the second symbol associated with the directional input.

11. The computer readable storage medium for performing the method of claim 9, wherein the displaying comprises:

determining a perimeter for positioning the set of symbols around the first symbol; and providing instructions to position each symbol in the set of symbols on the perimeter in an appropriate position.

12. The computer readable storage medium for performing the method of claim 11, wherein the providing instructions comprises:

determining the set of symbols associated with the first symbol;

determining the directions associated with the respective at least one modifier key associated with the set of symbols; and providing instructions to position each of the symbols in the set of symbols corresponding to the direction of the respective at least one modifier key.

13. The computer readable storage medium for performing the method of claim 9, the method further comprising providing instructions to display the set of symbols around the first symbol, each of the symbols in the set positioned in a direction corresponding to a modifier key associated with the respective symbol.

14. The computer readable storage medium for performing the method of claim 9, wherein the receiving the directional drag comprises:

determining that a selector actuated a touch sensitive screen at a first position; and determining that the selector slid across the touch sensitive screen to a second position.

15. In a computer system having a graphical user interface including a display and a user interface selection device, a method of inputting data using a set of soft keys on the display, the method comprising:

receiving a selection of a first soft key from the set of soft keys, the first soft key including a first symbol;

displaying a second symbol associated with the first symbol before receiving a direction input, the displaying comprising:

waiting a pre-defined period of time after receiving the selection;

generating a graphical depiction of the second symbol associated with the first symbol on the display in an appropriate position after the pre-defined period of time has elapsed;

receiving a direction input provided by the user interface selection device; and inputting a second symbol associated with the direction input and the first symbol.

16. The method of claim 15, wherein the generating a graphical depiction comprises:

after receiving the selection of the first soft key, determining the second symbol is associated with the soft key;

determining a directional position associated with the second symbol; and displaying the graphical depiction of the second symbol on the display, the second symbol positioned in accordance with the directional position associated with the second symbol.

17. The method of claim 15, wherein the receiving the direction input comprises:

noting an initial position of a selector on a touch sensitive screen;

noting a final position of the selector on the touch sensitive screen; and determining a direction that the selector moved with respect to a predetermined reference.

18. The method of claim 15, further comprising:

providing the set of soft keys on a display in a customizable arrangement, wherein an application selects from one of at least two different arrangements.

19. The method of claim 15, further comprising:

providing the set of soft keys on a display in a customizable arrangement, wherein an application selects the arrangement and the set of the soft keys.

20. The method of claim 15, further comprising:

after receiving the selection of the first soft key, determining one or more additional symbols associated with the soft key;

determining a directional position associated with each of the one or more additional symbols; and displaying a graphical depiction of the one or more additional symbols on the display, the one or more additional symbols positioned in accordance with the directional position associated with the second symbol.

* * * * *